3,036,124
MANUFACTURE OF CARBOXYLIC ACIDS
Andrew John, Jr., Wilmington, Del., assignor to Hercules Powder Company, Wilmington, Del., a corporation of Delaware
No Drawing. Filed Aug. 24, 1959, Ser. No. 835,441
3 Claims. (Cl. 260—533)

This invention relates to an improved process for the production of carboxylic acids from olefinic compounds and carbon monoxide.

There have recently been patented new methods for the production of carboxylic acids that are characterized by reacting an olefinic compound with carbon monoxide under substantially anhydrous conditions in the presence of certain acidic catalysts, and thereafter adding water to the reaction mixture to form a carboxylic acid. These methods which differ primarily in the catalyst employed are described in U.S. 2,831,877 to H. Koch and in U.S. 2,876,241 to H. Koch et al. In the first instance the catalyst is concentrated sulfuric acid, anhydrous hydrogen fluoride, anhydrous chlorosulfonic acid or anhydrous hydrogen fluoride and boron trifluoride. In the second instance the catalyst is monohydroxyfluoboric acid which, if desired, may be mixed with phosphoric acid or sulfuric acid. All of the above named catalysts are normally liquid materials.

In accordance with the present invention it has been found that solid phosphoric acid is an effective catalyst for the reaction of carbon monoxide and an olefinic compound under substantially anhydrous conditions and that by virtue of the fact that it is a solid material, this form of phosphoric acid offers certain advantages over the employment of a liquid catalyst. Among the advantages are that solid phosphoric acid can be separated easily from the reaction product by filtration or equivalent technique, that it is less corrosive than the known catalysts, that it is not altered in the process and can be re-used an as yet undetermined number of times, and that its use makes possible completely different manipulative techniques for carrying out the reaction; for instance, it permits carrying out the reaction continuously by passage of the reactants through a packed column containing the catalyst.

Stated more concisely, the invention is an improvement in the manufacture of carboxylic acids wherein an olefinic compound is reacted with carbon monoxide under substantially anhydrous condition and the reaction product diluted with water to form a carboxylic acid, which improvement comprises reacting the olefinic compound and carbon monoxide in the presence of solid phosphoric acid as a catalyst.

The term "solid phosphoric acid" is used herein in accordance with its accepted meaning. It is a calcined composite of a phosphoric acid and a siliceous adsorbent. Such composites are formed, for instance, by mixing a phosphoric acid, preferably orthophosphoric acid, with a finely-divided siliceous material, e.g., kieselguhr, diatomaceous earth, silica gel, etc., extruding the mixture to form shaped particles, calcining at 350–500° F. and further calcining at a temperature of about 500–1000° F.

The following examples are presented for the purpose of illustrating the invention. Parts and percentages are by weight unless otherwise specified.

*Example 1*

Into a stainless steel autoclave equipped with a magnetic stirrer there was placed 200 parts of a solid phosphoric acid that had been prepared by mixing concentrated (90%) orthophosphoric acid with powdered kieselguhr, extruding the pasty mixture to form small cylindrical pellets, calcining at 400° F. for about 2 hours, and then calcining at about 700° F. for 2 more hours. The phosphoric acid and kieselguhr were in such proportions that the finished composite contained approximately 50% acid calculated as phosphorous pentoxide.

The autoclave was next flushed with carbon monoxide and then pressured to 2700 p.s.i.g. with carbon monoxide. Next, while controlling the temperature of the autoclave contents to within the range of 50° to 100° C. there was sprayed into the autoclave 42 parts of 2-methyl pentene-1 over the course of 55 minutes. The run was continued for another 3 hours and 20 minutes and after cooling the pressure in the autoclave was released.

Upon opening the autoclave 200 parts of n-heptane were added and the contents stirred to disperse the catalyst. Then 36 gm. of water were added with stirring. The contents of the autoclave was then filtered under nitrogen to separate the catalyst and the filtrate was washed with water until it had a pH of about 3.

From the acid number and bromine number of the washed filtrate it was calculated that 82% of the olefin had reacted and that the filtrate contained 17.1 parts of α,α-dimethyl valeric acid, assuming that all unsaturation in the filtrate was attributable to unreacted olefin and the acid number attributable to carboxylated olefin. This indicated a yield of 34% based on the amount of olefin reacted. The reasonableness of the above assumptions was verified by distilling the filtrate whereby there was obtained 16 parts of pure α,α-dimethyl valeric acid and 2.1 parts of a higher boiling residue having an acid number of 65.

*Example 2*

The procedure of Example 1 was followed with these exceptions: 80 parts of n-hexane was used as a diluent during the reaction; the amount of catalyst was increased to 250 parts; the amount of olefin pumped into the autoclave was 84 parts over a period of 1.5 hours; and the amount of water added at the end of the reaction was 9 parts. The run was continued for 4.0 additional hours. Based on the bromine number and acid number of the water washed reaction product, 84% of the olefin reacted and there was obtained a 30% yield of α,α-dimethyl valeric acid based on the amount of olefin reacted.

*Example 3*

The procedure of Example 2 was followed using as the catalyst the solid phosphoric acid that had been recovered from Example 2. The introduction of olefin was over a period of 1.1 hours with 8.0 additional hours after all the olefin was added. The yield of α,α-dimethyl valeric acid (based on the amount of olefin reacted) was 47% with 78% of the olefin having reacted.

*Example 4*

Into a stainless steel autoclave equipped with a magnetic stirrer there was placed 140 parts of a solid phosphoric acid prepared as described in Example 1 and 95 parts of n-hexane. The autoclave was next flushed with carbon monoxide and then pressured to 1600 p.s.i.g. with carbon monoxide. While maintaining the contents of the autoclave at approximately 125° C., 56 parts of butene-2 was introduced over a period of 0.75 hour and the run continued for an additional 9 hours. Recovered unreacted butene-2 showed that 36% of the olefin had reacted and that the yield of α-ethyl-α-methyl acetic acid was 20.3% based on the amount of olefin reacted.

The process of the invention is widely applicable to olefinic compounds of varying structure. As starting materials there can be used, for instance, aliphatic olefins such as ethylene, propylene, butene-2, isobutene, 2-ethyl hexene-1, nonene-1, hexadecene-1, and the like, as well as mixtures of such aliphatic olefins; there can also be used as starting materials cyclic olefins such as cyclohexene and diolefins such as 1,3-butadiene. Unsaturated carboxylic acids such as oleic acid are also suitable starting materials.

To carry out the process it is merely necessary to contact the olefinic compound with carbon monoxide in the presence of solid phosphoric acid, the order in which the materials are contacted being immaterial. The reaction conditions are essentially the same as in the prior art. The reaction, for example, can be carried out at ordinary room temperature and atmospheric pressure although it is possible, and sometimes beneficial, to carry out the reaction at a lower or higher temperature or at superatmospheric pressure. In general, a temperature within the range of about 0° to 200° C. and a pressure ranging from atmospheric up to about 500 atmospheres can be used. Preferred temperatures are in the range of 25 to 125° C. and preferred pressures in the range of 500 to 3000 p.s.i.g. While the reaction of the olefinic compound and carbon monoxide does not require the presence of a diluent, it may be an advantage in some cases to employ an inert liquid diluent to facilitate handling the reaction product.

The reaction of course must be conducted under substantially anhydrous conditions. It is permissible, however, to introduce water during the course of the reaction to hydrate the reaction product as it is formed. For instance it is sometimes advantageous to introduce from about 0.5 to 0.75 mole of water following the addition of each mole of olefin.

In batch operation after the reaction has proceeded to the desired extent, the solid phosphoric acid is easily separated by filtration. When operating continuously as, for instance, by passing an olefinic compound and carbon monoxide through a bed of catalyst, no subsequent separation of the catalyst is usually necessary.

To obtain the desired carboxylic acid from the olefinic compound-carbon monoxide reaction product, it is simply necessary to add the theoretical amount of water required to hydrate the reaction product. If the water is added after the separation of catalyst, an excess of water is not harmful but an excess of water should be avoided if its addition precedes the separation of catalyst.

What I claim and desire to protect by Letters Patent is:

1. In the manufacture of carboxylic acids wherein an olefinic hydrocarbon is reacted with carbon monoxide under substantially anhydrous conditions and the reaction product is diluted with water to form a carboxylic acid, the improvement of contacting the olefinic hydrocarbon and carbon monoxide in the presence of solid phosphoric acid as a catalyst, said solid phosphoric acid being a calcined composite of a phosphoric acid and a siliceous adsorbent.

2. The process of claim 1 wherein the olefinic compound is 2-methyl pentene-1.

3. The process of claim 1 in which the olefinic compound is butene-2.

References Cited in the file of this patent

UNITED STATES PATENTS

| | | |
|---|---|---|
| 1,924,766 | Carpenter | Aug. 29, 1933 |
| 2,015,065 | Carpenter | Sept. 24, 1935 |
| 2,876,241 | Koch et al. | Mar. 3, 1959 |